(12) United States Patent
Yang et al.

(10) Patent No.: US 11,143,509 B2
(45) Date of Patent: Oct. 12, 2021

(54) POSITIONING BASED ON ILLUMINATION SOURCES

(71) Applicant: SIGNIFY HOLDING B.V., Eindhoven (NL)

(72) Inventors: Hongming Yang, Eindhoven (NL); Peter Hoekstra, Waalre (NL); Benjamin Johannes Vos, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 660 days.

(21) Appl. No.: 16/071,099

(22) PCT Filed: Jan. 16, 2017

(86) PCT No.: PCT/EP2017/050771
§ 371 (c)(1),
(2) Date: Jul. 19, 2018

(87) PCT Pub. No.: WO2017/125338
PCT Pub. Date: Jul. 27, 2017

(65) Prior Publication Data
US 2021/0180955 A1  Jun. 17, 2021

(30) Foreign Application Priority Data

Jan. 19, 2016 (EP) .................................... 16151903

(51) Int. Cl.
*G01C 21/20* (2006.01)
*G06T 7/70* (2017.01)
*H04W 4/029* (2018.01)

(52) U.S. Cl.
CPC .............. *G01C 21/206* (2013.01); *G06T 7/70* (2017.01); *H04W 4/029* (2018.02)

(58) Field of Classification Search
CPC ......... G01C 21/206; H04W 4/029; G06T 7/70
See application file for complete search history.

(56) References Cited

U.S. PATENT DOCUMENTS 8,626,443 B2 * 1/2014 Robertson ............ G01C 22/006
701/532
8,752,761 B2  6/2014 Calvaresse et al.
(Continued)

FOREIGN PATENT DOCUMENTS

CN 104567875 A 4/2015
WO 2015144553 A1 10/2015

*Primary Examiner* — Richard M Camby

(57) ABSTRACT

A method comprising: A) using a mobile device's camera to capture a first image; B) by reference to a first illumination source appearing in the first image, determining first heading information of the mobile device; C) as the mobile device moves to a second location, using one or more inertial sensors of the mobile device to extrapolate a plurality of extrapolated first candidate locations and respective first candidate headings of the mobile device; D) at the second location, using the camera to capture a second image; E) by reference to a second illumination source appearing in the second captured image, determining a plurality of second candidate locations and respective second candidate headings of the mobile device; and F) based on a comparison of the extrapolated first candidate locations and headings with the second candidate locations and headings, determining at least one estimated location and respective heading of the mobile device.

14 Claims, 9 Drawing Sheets

(56) References Cited

U.S. PATENT DOCUMENTS

| | | | |
|---|---|---|---|
| 8,994,590 B2 * | 3/2015 | Jarvis | G01S 5/02 342/451 |
| 2007/0027612 A1 * | 2/2007 | Barfoot | G05D 1/024 701/117 |
| 2007/0247366 A1 * | 10/2007 | Smith | H04W 4/33 342/464 |
| 2014/0093249 A1 | 4/2014 | Roberts et al. | |

* cited by examiner

Top view

Top view

POSITIONING BASED ON ILLUMINATION SOURCES

CROSS-REFERENCE TO PRIOR APPLICATIONS

This application is the U.S. National Phase application under 35 U.S.C. § 371 of International Application No. PCT/EP2017/050771, filed on Jan. 16, 2017, which claims the benefit of European Patent Application No. 16151903.8, filed on Jan. 19, 2016. These applications are hereby incorporated by reference herein.

TECHNICAL FIELD

The present disclosure relates to the positioning (localization) of a mobile device based on detection of illumination sources in captured images.

BACKGROUND

In a localization system such as an indoor positioning system, the location of a wireless device such as a mobile user terminal can be determined with respect to a location network comprising a plurality of wireless reference nodes, in some cases also referred to as anchor nodes. These anchors are wireless nodes whose locations are known a priori, typically being recorded in a location database which can be queried to look up the location of a node. The anchor nodes thus act as reference nodes for localization. Measurements are taken of the signals transmitted between the mobile device and a plurality of anchor nodes, for instance the RSSI (received signal strength indicator), ToA (time of arrival) and/or AoA (angle of arrival) of the respective signal. Given such a measurement from multiple nodes, the location of the mobile terminal may then be determined relative to the location network using techniques such as trilateration, multilateration, triangulation or fingerprinting. Given the relative location of the mobile terminal and the known locations of the anchor nodes, this in turn allows the location of the mobile device to be determined in more absolute terms, e.g. relative to the globe or a map or floorplan.

There are various reasons why it may be desirable to be able to detect the location of a wireless device, such as to provide location based services. For instance, one application of a positioning system is to help a user navigate within a building or other indoor and/or outdoor complex (e.g. a campus). Another is to automatically provide a wireless mobile device with access to a location-based service, e.g. control of a utility such as a lighting system, on condition that the mobile device is found to be located in a particular spatial region or zone associated with the lighting or other utility. Other examples of location based services or functionality include location-based advertising, service alerts or provision of other location-related information, user tracking, asset tracking, or taking payment of road tolls or other location dependent payments.

Nowadays indoor or outdoor localization can also be performed using illumination sources (lamps or luminaires) as the reference nodes, rather than dedicated RF anchor nodes. In this case a code may be modulated into the light emitted by the illumination source using coded light techniques, sometimes referred to as Visible Light Communications (VLC). The mobile device can then capture images of the illumination sources, and the codes can also be extracted from the light emitted by those illumination sources as received at the mobile device. The received intensity or ToF of the light from an illumination source gives the distance from that illumination source, and the respective code identifies the illumination source in order to allow its location to be looked up. Hence the illumination sources can be used for localization in an analogous manner to that described above. An accurate device heading can be obtained if there is more than one VLC illumination source in the camera view simultaneously. Note: if a point detector was being used then a distance from three nodes would be needed for an unambiguous solution (the intersection of three circles gives a single point whereas the intersection of only two circles gives two points). However, with an image that also captures the spatial distribution, then if only two illumination sources appear in the image and the VLC codes (IDs) of both are detectable, then only a minimum of these two nodes are needed to eliminate ambiguity (e.g. consider the situation where the source emitting the first code appears in the left hand side of the image and the source emitting the second code appears in the right—this is distinguishable from the situation where the source emitting the second code appears in the left hand side of the image and the source emitting the first code appears in the right). I.e. the heading direction of the mobile device along with the locations of the two light sources within the captured image will resolve the ambiguity.

U.S. Pat. No. 8,752,761 shows how a position of a mobile device can be determined relative to a light source given the height of the light source.

SUMMARY

However, it is not always the case that two illumination sources appear simultaneously in the same captured image. To overcome this issue, the present disclosure provides particular techniques for combing the use of inertial sensors with positioning based on illumination sources.

According to one aspect disclosed herein, there is provided a method comprising: A) at a first location, using a camera of a mobile device to capture a first image in which a first illumination source appears; B) by reference to the first illumination source as appearing in the first image, determining first heading information of the mobile device; C) as the mobile device moves from the first location to a second location, using one or more inertial sensors of the mobile device to extrapolate from the first heading information and from first position information of the mobile device to generate a plurality of extrapolated first candidate locations of the mobile device and a plurality of respective extrapolated first candidate headings of the mobile device; D) at the second location, using the camera of the mobile device to capture a second image in which a second illumination source appears, wherein the second illumination source does not appear within field of view of the camera until the mobile device has reached the second location from the first location; E) by reference to the second illumination source as appearing in the second captured image, determining a plurality of second candidate locations of the mobile device, and a plurality of respective second candidate headings of the mobile device; and F) based on a comparison of the extrapolated first candidate locations and headings with the second candidate locations and headings, determining at least one estimated location and respective heading of the mobile device.

In embodiments, step B) may comprise: by reference to the first illumination source as appearing in the first image, determining a plurality of first candidate locations of the mobile device, and a plurality of respective first candidate headings of the mobile device. And step C) may comprise: as the mobile device moves to the second location following the capturing of the first image, using one or more inertial sensors of the mobile device to extrapolate from the first candidate locations and headings, thereby generating the plurality of extrapolated first candidate locations and respective extrapolated first candidate headings of the mobile device.

In embodiments, the method may further comprise: G) as the mobile device moves from the second location to a third location following the capturing of the second image, using one or more inertial sensors of the mobile device to extrapolate from the second candidate locations and headings, thereby generating a plurality of extrapolated second candidate locations and respective extrapolated second headings of the mobile device; H) at the third location, using a camera of the mobile device to capture a third image in which a third illumination source appears; I) by reference to the third illumination source as appearing in the third image, determining a plurality of third candidate locations of the mobile device, and a plurality of respective third candidate headings of the mobile device; and J) based on a comparison of the extrapolated second candidate locations and headings with the third candidate locations and headings, determining an updated estimated location and respective heading of the mobile device.

In embodiments, step F) may comprise allocating relative weights to the second candidate positions and headings, wherein step J) may take into account the relative weights.

In embodiments, instead of using a plurality first candidate headings and locations, step B) may comprise: identifying a known first location of the mobile device, and by reference to the first image identifying a respective heading corresponding to the known first location; and step C) may comprise extrapolating from said known location and respective heading to generate the plurality of extrapolated first locations and respective extrapolated first headings. For example, the known first location may be obtained from one of:—a user input,—a fix from another localization system that is then lost,—an RF tag when a user (6) of the mobile device goes through an entrance, or—two illumination sources initially appearing simultaneously in the field of view of the camera Either way, whether a plurality first candidate headings and locations are used or whether instead said first known location is used, in embodiments said extrapolation may comprise including a randomization in the generation of one, some or all of the extrapolated first candidate locations and/or headings; and/or including a random factor in the generation of one, some or all of the extrapolated second candidate locations and/or headings.

In embodiments the generation of the first, second and/or third candidate locations and headings may comprise limiting the number of first, second and/or third candidate positions and respective headings based on additional information. For example, said additional information may comprise knowledge that the first, second and/or third illumination source has a non-circular and non-spherical shape, the limitation being performed based on said shape.

In embodiments, the determination of the first, second and/or third candidate locations and respective headings may comprise using one or more sensors of the mobile device to detect an orientation of the camera, and taking the orientation into account in the determination e.g. together with knowledge of the locations and heights of the illumination sources (see below).

In embodiments, the first, second (and where applicable third) illumination sources are ones of a larger number of illumination sources, and the determination of the estimated location and headings may be further based on a map indicating locations of the illumination sources. In embodiments the determination of the estimated location and heading may be further based on known heights of the first and second (and where applicable third) illumination sources.

In embodiments, the first and second illumination sources are ones of a greater number of illumination sources whose locations are given by a predetermined map. In embodiments, the first illumination source may be identified prior to step F) but the second illumination source need not be identified prior to step F), in which case step F) may be performed based on said predetermined map, giving at least the location of the first light source from its identity and the relative displacements of the light sources relative to one another. Alternatively, the second illumination source may be identified prior to step F) but the first illumination source need not be identified prior to step F), in which case step F) may be performed based on said predetermined map, giving at least the location of the second light source from its identity and the relative displacements of the light sources relative to one another. For instance, the first or second illumination source may be identified based on: a respective code embedded in the illumination emitted by the first or second illumination source respectively. As another example the first or second illumination source may be identified based on a user input.

In embodiments, the extrapolation of steps C) and G) is performed based on a pedestrian dead reckoning model, wherein the method further comprises adapting one or more parameters of the pedestrian dead reckoning model based on the estimated position and/or heading as estimated in step C), and wherein the adapted model is used to perform the extrapolation in step G).

According to another aspect disclosed herein, there is provided a computer program product embodied on computer-readable storage and configured so as when run on one or more processing units to perform a method in accordance with any of the embodiments disclosed herein.

According to another aspect disclosed herein, there is provided apparatus comprising a localization module, wherein the localization module is configured to perform operations in accordance with any of the embodiments disclosed herein. The apparatus may compromise the mobile device, a server arranged to communicate with the mobile device, or a system comprising the mobile device and server.

BRIEF DESCRIPTION OF THE DRAWINGS

To assist understanding of the present disclosure and to show how embodiments may be put into effect, reference is made by way of example to the accompanying drawings in which.

DETAILED DESCRIPTION OF EMBODIMENTS

The following discloses a positing system and method (e.g. an indoor positioning system and method), which is based on the fusion of visible light communications (VLC) and pedestrian dead reckoning (PDR) based indoor positioning solutions. In embodiments this uses a particle filter based approach to undertake the fusion of PDR to the VLC based indoor positioning system. By applying this approach, the accuracy, reliability and coverage range can be improved compared to the VLC-only based indoor positioning solutions. For instance, it is shown how an initial device location and heading can be derived, as well as continuous indoor positioning with the disclosed fusion approach.

The method provides for path selection for a multimodal positioning system employing pedestrian dead-reckoning and modulated illumination light. The method begins by detecting a first light source using a camera on a mobile device, and establishing a first position relative to the first light source and a first mobile device-heading relative to the first light source based on the first image captured by the camera. A set of path seeds is then generated, the path seeds having an initial path-position relative to the position of the light source based on the detection and having an initial path-heading corresponding head based on the camera-heading. Using the path seeds and input from the pedestrian dead-reckoning system in the form step detection, step direction and step length can be used to propagate a set of paths corresponding with the path seeds. When a second light source is then detected using the camera on the mobile device, the method establishes a second position relative to the first light source and a second mobile-device heading relative to the first light source based on the first image captured by the camera. Utilizing a known position of the first light source or the second light source in combination with map information comprising the first light source and second light source position, a path can then be selected from the set of paths that best matches the detected data. In embodiments, the detected data comprises: the first position relative to the first light source and the first mobile device-heading relative to the first light source, and the second position relative to the second light source and the second mobile device-heading relative to the second light source.

Figure 1A:
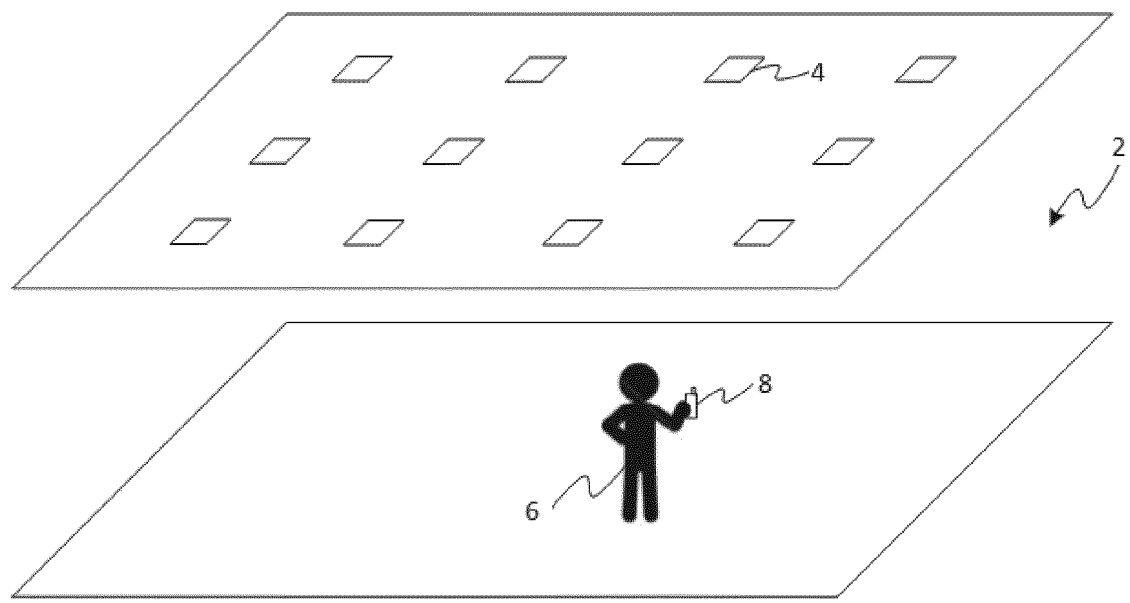
FIG. 1a is a schematic illustration of an environment in which are found a plurality of illumination sources and a mobile device.

FIG. 1a shows an example scenario in which the teachings herein can be employed. In FIG. 1a, a plurality of illumination sources 4 are disposed at different positions within an environment 2 such as throughout the interior of a building or part of a building, or across an outdoor space such as a park, or a combination of indoor and outdoor spaces such as a campus. Also present in the environment 2 is a user 6 carrying a mobile device 8 about his or her person, e.g. holding it in a hand. For example the mobile device may take the form of a portable user terminal such as a smart phone, tablet, smart watch or smart glasses.

The illumination sources 4 are arranged to emit visible light into the environment 2 for the purpose of illumination, so that people can see within the environment. Each of the illumination sources 4 takes the form of a luminaire or individual lamp (a lamp referring to an individual lighting element, whilst a luminaire refers to a unit comprising one or more lamps plus any associated housing, socket and/or support). The illumination sources may take a variety of forms and may be mounted or placed in a number of possible ways, e.g. as ceiling mounted luminaires, or luminaries mounted on light poles.

Figure 1B:
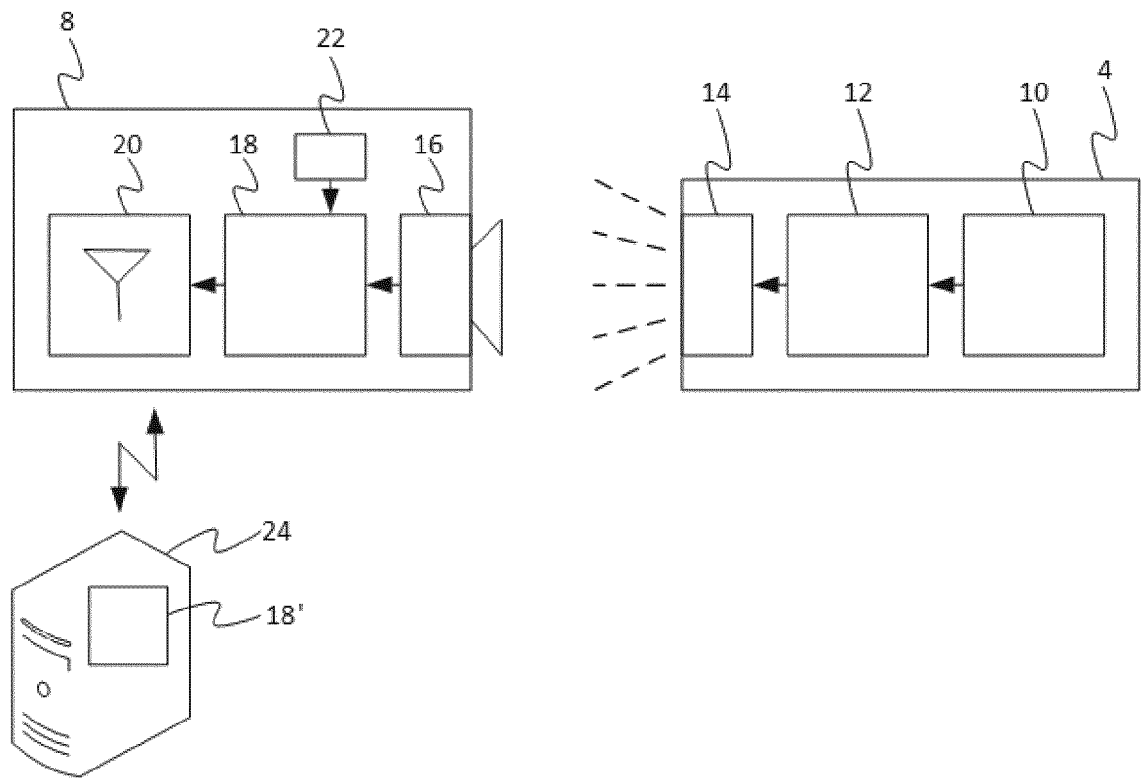
FIG. 1b is a schematic block diagram of an illumination source and a mobile device.

FIG. 1b shows further detail of an illumination source 4 and the mobile device 6. Some of all of the illumination sources may be configured in accordance with FIG. 1b. As shown, the illumination source 4 comprises an encoder 10, a driver 12 and at least one lamp 14. The encoder 10 is coupled to the driver 12 and the driver 12 is coupled to the lamp(s) 14. The encoder is configured to generate a code in the form of an ID which identifies the respective light source 4, and to control the driver 12 to cause this code to be embedded in the illumination emitted by the lamp(s) 14 by modulating the emitted illumination at a frequency substantially beyond human perception. E.g. the code could take the form of a characteristic modulation frequency, or a digital value encoded into the light using a line code or other encoding technique such as Manchester coding. Various techniques for encoding a signal into visible light will in themselves be familiar to a person skilled in the art.

The encoder 10 may be implemented in the form of software embodied on memory of the illumination source 4 (comprising one or more storage media in one or more memory units), and arranged to run on a processing apparatus of the illumination source 4 (comprising one or more processing units). Alternatively it is not excluded that the encoder could be implemented in the form of dedicated hardware circuitry, or configurable or reconfigurable hardware such as a PGA or FPGA, or any combination of software and hardware.

The mobile device 8 comprises a camera 16, a localization module 18, one or more inertial sensors 22 (e.g. one or more gyroscopes and/or one or more accelerometers, such as a three-axis accelerometer), and optionally a wireless interface 20 (at least for wireless transmission and in embodiments for both wireless transmission and reception). The camera 16 is coupled to the localization module 18, the inertial sensor(s) 2 are coupled to the localization module 18, and optionally the localization module 18 is coupled to the wireless interface 20.

The localization module 18 may be implemented in the form of software embodied on memory of the mobile device 8 (comprising one or more storage media in one or more memory units), and arranged to run on a processing apparatus of the mobile device 8 (comprising one or more processing units). Alternatively it is not excluded that the encoder could be implemented in the form of dedicated hardware circuitry, or configurable or reconfigurable hardware such as a PGA or FPGA, or any combination of software and hardware.

In embodiments the localization module 18 is configured to decode the codes from the illumination sources' illumination based on the captured images of those illumination sources 4, and to perform localization (i.e. positioning) operations in accordance with the disclosed techniques. Alternatively one or both of these responsibilities could be offloaded to a server 24. In the latter case the localization module 18 on the mobile device 8 collects the images and sends them to the server 24 via the wireless interface 20 (various suitable communications technologies for this will in themselves be familiar to a person skilled in the art). Some or all of the decoding of the codes and/or the localization is then performed by a localization module 18' run on the server 24. In general, it will be appreciated that the techniques disclosed herein can be implemented in the mobile device 6 and/or offloaded to a server 24 in any combination of device-based and server-based functionality.

Visible light communications (VLC) combined with camera detection is often able to provide accurate and reliable indoor positioning performance. This is especially true when there is a VLC light source 4 in the view of a camera and that the code in the VLC can be decoded correctly by a device 8 equipped with a camera 16. An accurate device heading can be obtained if there are more than one VLC light source 4 in the camera view simultaneously.

In practice however, it might happen that there is not always continuous detection of the VLC data even if there is a VLC source in the camera view. This might happen because there is too little time or too small a footprint of a VLC source 4 in the image, or because there is limited computing power in the device 8 to undertake the image processing tasks. To deal with these issues, a particle filter based approach can be employed. In this approach, one does not necessarily need to detect the code in each individual light source 4. Rather, for some illumination source, it is only required to detect the existence of the "light blobs", i.e. the shape and intensity (and optionally also colour) properties of the illumination source in the image rather than the modulation, or put another way the visible appearance or footprint of the illumination source 4 in the image (as opposed to the VLC footprint). Based on predetermined knowledge of a map of the illumination sources 4, it is already possible to estimate the positions of the mobile device 8. Another function of this particle filter based approach is that one can estimate the heading of the mobile device 8 quite precisely, by assigning each particle a different movement direction and then selecting the best particle that matches the detection of the VLC codes or the light blobs.

Pedestrian dead reckoning (PDR) is another different approach for indoor positioning. PDR uses various sensors inside a mobile device 8 (e.g. inertial sensors 22 such as an accelerometer and/or gyroscope, or other sensors such as a magnetometer) in order to track the relative movement of the device 8 based on step detection applied in relation to the user 6. As long as the initial position is provided from outside, PDR can work independently without prior system deployment. The computing power needed to process the sensor data from sensors such as inertial sensors 22 or a magnetometer is also significantly lower than for VLC. However, the level of accuracy and reliability of PDR is also significantly lower than VLC based solution. The heading direction provided by a magnetometer can also be seriously influenced by various magnetic disturbances in the field.

The performance of PDR, suffers from a number of factors.

Firstly, on the system level, PDR only gives an indication of relative movement, so some initial absolute position information needs to be provided from external parties.

Secondly, most of the current PDR solutions use a magnetometer to derive device heading information. However, the accuracy and reliability of a magnetometer is normally limited, due to various magnetic interferences in the environment. Some calibration procedure needs to be undertaken for each type of device 8 to deal with the magnetic interferences from other nearby components inside a mobile device 8. And, what is even more troublesome for a user 6 is that for each site, the magnetic field distribution can also be influenced by various magnetic interference sources, and the interference is even often dynamic.

Moreover, different people have different walking behaviours. For instance, the step length varies a lot for different genders and across different age groups. Due to various sensor noises and disturbances, and also the complexity of human behaviours, it is almost impossible to derive an accurate step length only from inertial sensors 22. Normally a certain heuristic step length model is adopted, which does not reliably apply across a general group of users.

The accuracy of step detection is also limited in practice, due to the complexity of the human activities, and also due to the various sensor noises and disturbances.

There are also issues with VLC based positioning.

In general, it is not possible to get an indoor position fix if a VLC light source 4 or a light blob is missing from the camera view. Besides this general issue, there are also some more subtle but also very important issues, some of which are described below.

Figure 2A:
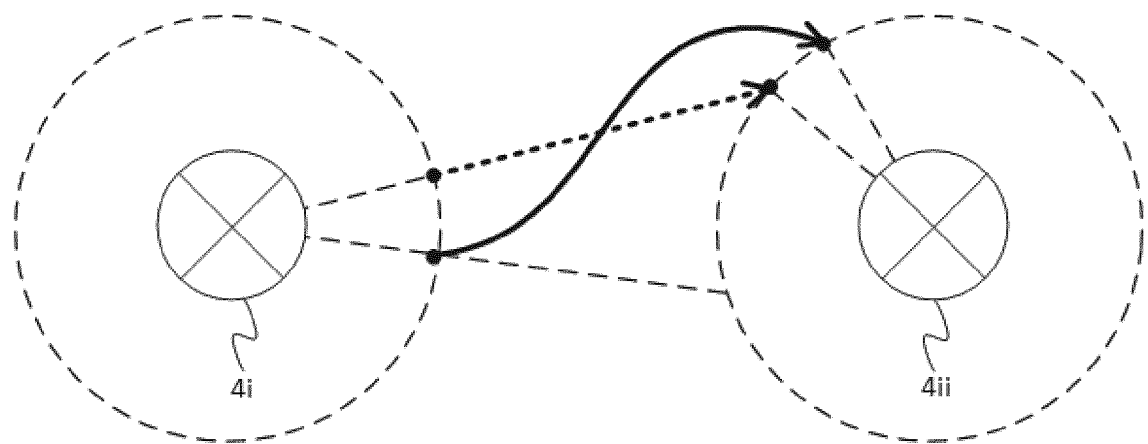
FIG. 2a is a schematic illustration of an issue experienced in estimating an initial heading of a mobile device.

For the initial heading detection for the VLC based indoor positioning solution, one can get the accurate device heading if more than one VLC light source 4 appears in the camera view simultaneously and the codes from multiple such sources 4 are detected. This situation however may not always happen in practice. Very often the situation occurs where the code from only a first VLC light source 4i is detected, and then the mobile device 8 moves into an area near a second VLC light source 4ii and detects the code from that second VLC light source 4ii, but can no longer detect the first. In this situation, according to the present disclosure, a particle filter approach is employed in order to determine the device heading upon detecting the code from the second VLC light source 4ii. Since there is no knowledge of the trajectory between the first and second VLC light sources 4i, 4ii, one approximation would be to assume that the user 6 simply walked in a straight line in between. If there is a relatively dense deployment of VLC enabled light sources 4, this is often a good approximation. However, there might not be a dense deployment of VLC light sources 4 everywhere, and the mobile device 8 may not be able to detect the codes of the first two VLC light sources 4i, 4ii successfully in practice. When there is a relatively large distance between a first detected VLC light source 4i and a second detected VLC light source 4ii, the user 6 may in fact take some different movement trajectory other than the straight line. If such a non-straight-line trajectory occurs, a wrong estimation would be made on the device heading based on the straight line approximation. With the error in the device heading, in combination with the employment of blob detection, subsequent positioning errors might well then be made, and it may even take a long time before this initial heading error can be corrected. At least another two successful detections of the codes from two different VLC light sources 4i, 4ii are needed. This issue is illustrated by FIG. 2a, where the actual movement trajectory and heading are illustrated by the heavy solid black line, and the estimated movement trajectory and heading are illustrated by the heavy dotted black line.

Figure 2B:
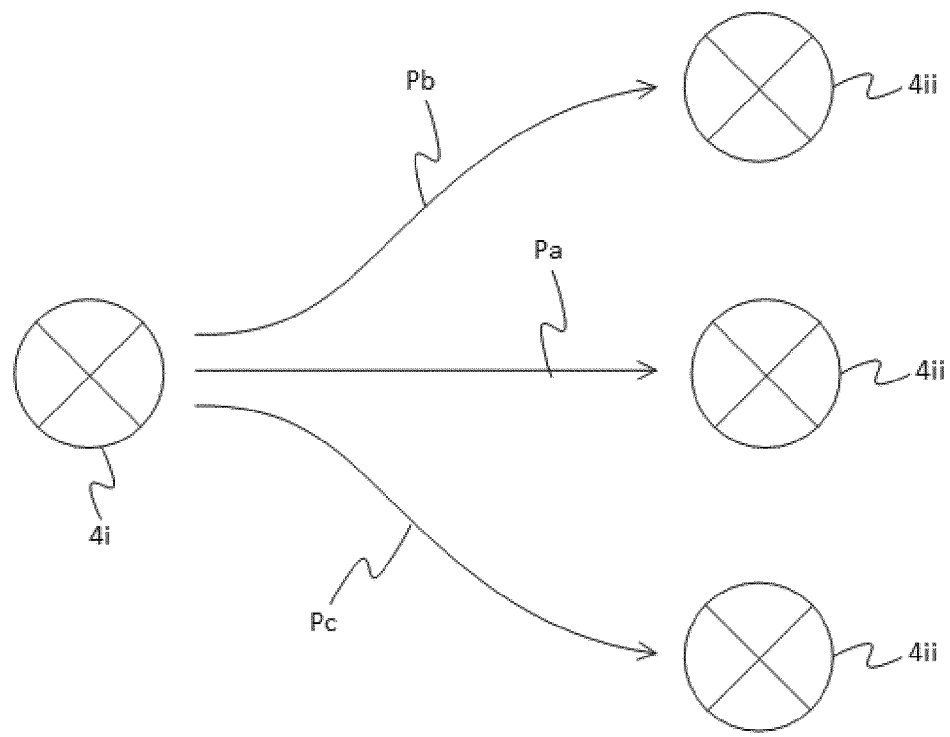
FIG. 2b is a schematic illustration of an issue experienced in estimating a position of a mobile device using "lighting blobs"

Besides the initial heading, another issue may be encountered during the continuous indoor positioning process even if the device heading has been obtained accurately. That is, when the user 6 walks from the area near a first VLC light source 4i into that near a second light source 4ii which is detected as a light blob, there might be a gap in time when the mobile device 8 does not have any VLC light source or light blob in the camera view. In this situation, from a VLC point of view, again it could be assumed that a simple straight line trajectory was taken during this gap. Based on this assumption, the indoor positioning system could continue. However, in practice, the user 6 may take any arbitrary trajectory during the gap, and positioning errors might be made because of this. FIG. 2b illustrates one example of such errors.

In the example illustrated in FIG. 2b, when the user 6 walks along any of the three trajectories, a light blob will appear in the camera view from exactly the same angle and same distance. If it was assumed the shortest path was taken (the middle path in FIG. 2b), then positioning errors will be made if the user 6 actually took one of any of the other trajectories. Following this error, subsequent positioning errors might also happen. It might then take a long time to detect the error, until a successful VLC code reception is obtained.

Figure 3:
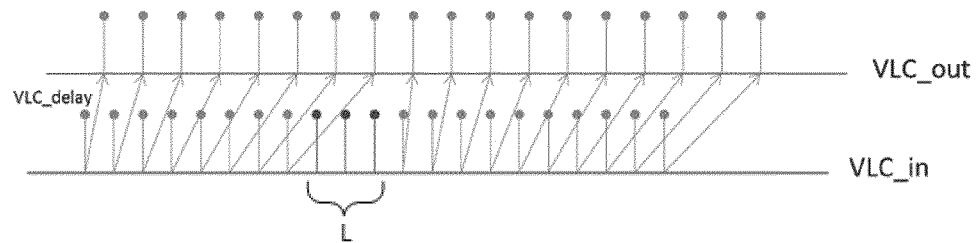
FIG. 3 is a schematic illustration of losing frames when capturing with a slow mobile device.
Figure 4:
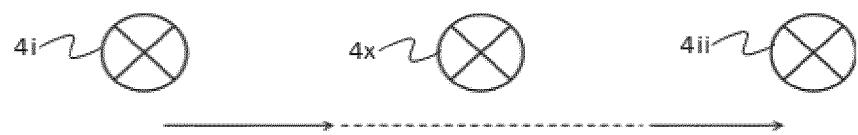
FIG. 4 is a schematic illustration of how a positioning error can occur due to image loses.

Moreover, in the above example, it has been assumed that there is a continuous stream of images available from the camera 16. In practice, however, there might be missing images from the camera sensor 16. This could happen for example with a device 8 with limited processing power. In that case it may not be possible to finish processing a first image and VLC detection related processing before a second image is already captured by the camera 16. Also one cannot simply keep lowering the image capturing rate. So what happens then is that the new image has to be buffered. The buffer keeps growing and some images will have to be dropped when the buffer is full. So essentially, some images will be lost from the stream. This issue is illustrated in the timing diagram FIG. 3 where (with time running left to right), the bars on in the top sequence represent the frames output from the buffer, and the bars in the lower sequence represent the received frames. The frames marked L are lost during the processing. What could also happen in practice is that the camera 16 might be blocked for some time. From an indoor positioning point of view, a positioning error might be made due to this issue of losing frames, as illustrated in FIG. 4. Here the user 6 walks from a first illumination source 4i along the trajectory illustrated by the arrow. Some images are lost when an intervening illumination source 4x is supposed to appear in the camera view. Then some time later some images are captured well and a light blob appears in the image. The new light blob is the second illumination source 4ii to appear in the images, but is in fact the third illumination source in the row. Due to the unexpected missing images, the positioning algorithm still thinks that this light blob corresponds to the intervening illumination source 4x. So, a positioning error is made due to this issue. Again subsequent positioning errors are possible, until a valid VLC code is decoded successfully. Note that this issue of dropping images can also be intentionally introduced in practice, simply to save the battery power of the mobile device 8.

Embodiments of the present disclosure provide an indoor positioning system (or indeed other kind of positioning system) comprising:
VLC light sources 4;
a mobile device 8 with a camera 16 and inertial sensors 22 (accelerometers and/or gyroscope, but not magnetometer); and
functional blocks of:
    VLC detection
    Light blob detection
    PDR block including step detection, step direction, step length calculation
    Device location estimation, based on the fusion between VLC positioning and PDR positioning
    Device heading estimation, based on the fusion between VLC positioning and PDR positioning The process elements comprise:
detecting a first VLC light code;
using PDR to give relative step direction and length, upon the detection of a step;
using VLC to get initial heading and position if there is an image gap between (a) the second VLC light or light blob detection and (b) the first VLC detection;
using PDR for the estimation of step lengths, false steps, missing steps, heading estimation, etc.;
PDR helps VLC to improve accuracy and reliability in cases such as:
    to bridge the gaps when there is no illumination source in view,
    to bridge the gaps caused by processing limitations,
    to save battery power,
    to detect height changes for better VLC indoor positioning, and/or
    to remove false position changes caused by false VLC data, etc.

In the following it is assumed that the method has access to a map on which an ID of each of the illumination sources 4 is mapped to a respective location of that illumination source 4 on the map. For instance in the case of an indoor space, the map may comprise a floor plan. The map may be stored locally on the mobile device 8, or on the server 24. It is also assumed that the heights of the illumination sources 4 are known (this could either be indicated on the map, or there may simply be assumed a fixed, common height, e.g. ceiling height). Further, when any given one of the illumination sources 4 appears in an image captured by the camera 16 then the method is able to determine a distance of the camera 16 from the light source, e.g. based on a received intensity of the light from that light source compared to a known emitted intensity, or based on a time-of-flight (or indeed based on any property of the light that varies with distance traveled by the light, e.g. if the intensity of different components of the light's spectrum attenuate differently as the light propagates through a medium such as air then this could be used to estimate distance). Furthermore, when the image of an illumination source 4 is captured, the method is able to detect a unique code embedded in the visible light emitted from that illumination source, wherein this code is or at least maps to the ID of the respective illumination source 4. Thus the location of the illumination source can be determined by looking up the ID in the map. The code itself may be embedded by any of a number of techniques which in themselves will be familiar to a person skilled in the art. For instance, the code may take the form of a unique modulation frequency at which the light is modulated, or a digital code embedded using a code such as Manchester coding, or even a unique spectrum of the light. In another variant, the code could be encoded into light emitted in the non-visible spectrum (e.g. IR or UV) along with the visible illumination, being emitted by the same source 4.

The disclosed positioning solution starts when the mobile device 8 detects the code of a first VLC light source 4i using the device camera 16. Then a rough estimation is obtained of the locations of the mobile device 8. The mobile device's heading and precise location still cannot yet be obtained due to geometric ambiguities. A number of "particles" are then generated, representing candidate locations. Each particle is also assigned a direction, which represents the heading direction of the mobile device 8, under the assumption of each respective candidate position.

Figure 5:
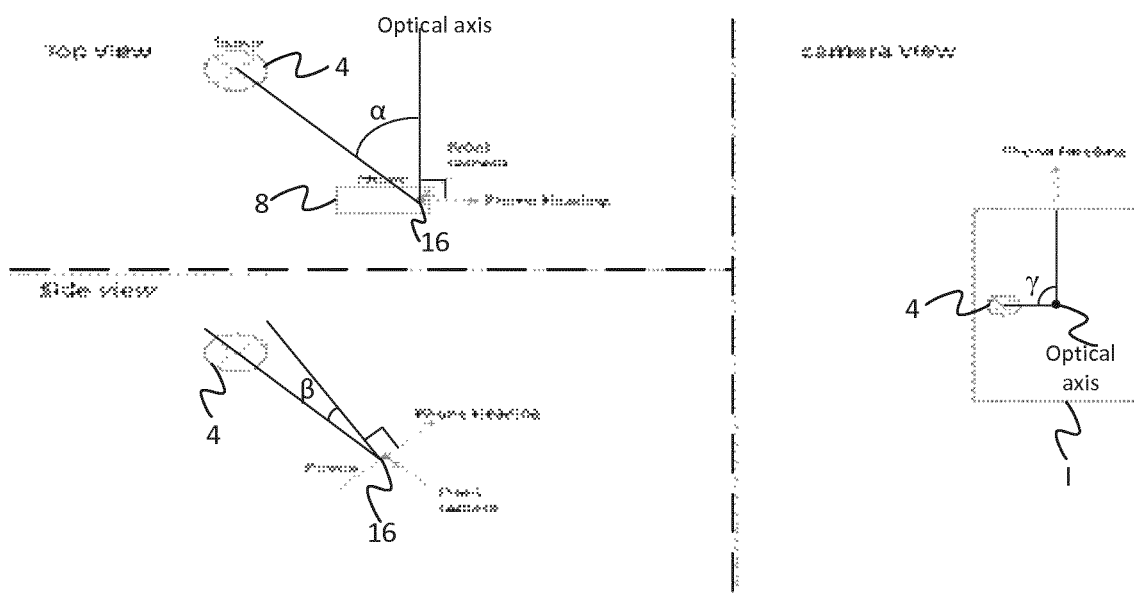
FIG. 5 is a schematic illustration of the position of a mobile device with respect to an illumination source and also the image view captured by the mobile device.
Figure 6:
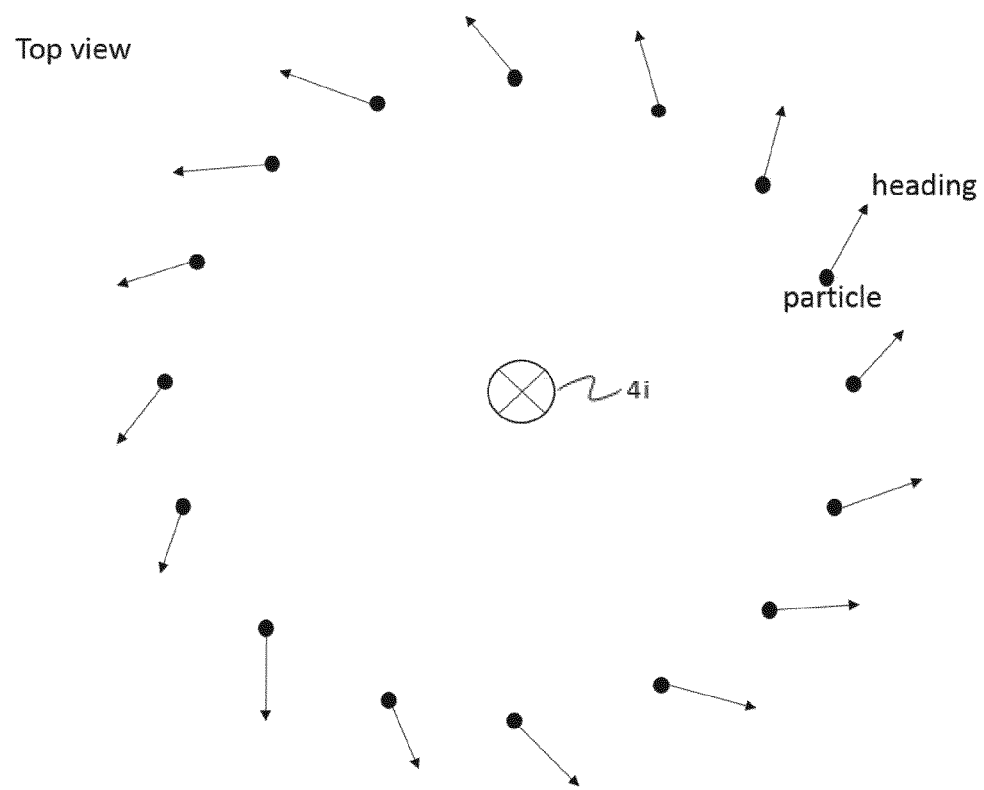
FIG. 6 is a schematic illustration of an initial seeding of particles with a mobile device's heading.

As an example is shown in FIG. 5. Here, the position of a mobile device 8, such as a smart phone, is depicted from a top view and a side view. Also the camera view I including an illumination source 4 is shown. Then the generation of the particles is illustrated in FIG. 6, corresponding to the example depicted in FIG. 5. U.S. Pat. No. 8,752,761 shows how a position of a mobile device can be determined relative to a light source given the height of the light source, and particularly, this reference shows the relevance of the height of the light source with regard to circle diameter. Refer to FIGS. 3 and 6 of U.S. Pat. No. 8,752,761. Corresponding angles $\alpha$, $\beta$, $\gamma$ are marked on FIG. 5 of the present disclosure.

When the first illumination source 4i is still inside the camera view I, the particles propagate based on the movement of the illumination source's location inside the camera view. Due to the symmetricity in the geometry, one still has a circular shape of all the possible positions, until the illumination source 4i leaves the camera view due to the movement of the mobile device 8. It is then impossible to continuously derive candidate positions and headings of the mobile device 8 based on the VLC light source 4i. According to the present disclosure however, the candidate positions and heading of the mobile device 8 are further derived based on the input from PDR. The continuous derivation of the candidate positions are implemented as propagation of the particles. That is to say, the initial sensor(s) 22 are used to extrapolate (project) possible updated positions and headings for the mobile device 8.

In comparison to normal PDR solutions where magnetometers are used to derive absolute device heading with respect the ground north, the techniques disclosed herein do not employ a magnetometer, and only employ inertial sensors such as an accelerometer and/or gyroscope to derive relative movement directions. The PDR works continuously and gives indications of relative step length and step direction with respect to the device heading. That is, using the inertial sensors 22 to detect each step, and assuming a certain step length per step, this gives the distance traveled. Further, changes in direction can also be detected based on the input from an inertial sensor 22 such as an accelerometer. For each detected step, each particle moves according to the relative direction and step length.

Figure 7:
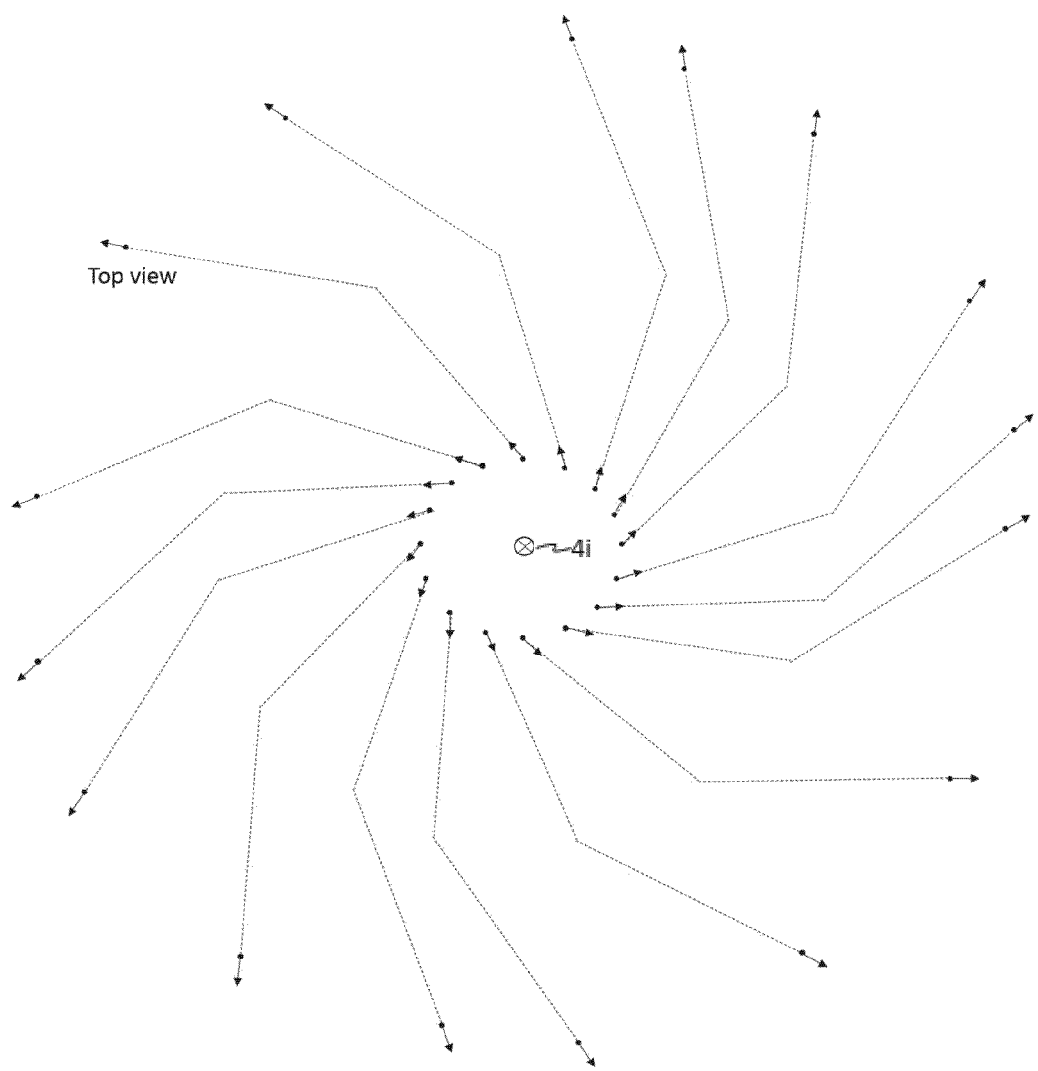
FIG. 7 is a schematic illustration of the propagation of the particles of FIG. 6 following a pedestrian dead reckoning (PDR) path when there is no illumination source in the camera view, starting from a number of candidate positions.

Suppose the user 6 is holding the mobile device 8 (e.g. phone) and is walking along the mobile device heading, as it is the most common case. The user 6 first walks forward for a few steps and then turn left and moves forward for a few steps. The propagation of the particles is illustrated in FIG. 7, following the relative path provided by PDR. During the propagation, some randomization may also be taken into consideration.

This particle propagation process continues until the camera 16 captures a second illumination source 4ii in the camera view with a VLC code detection. Note that here we take the example that both the VLC codes in the first and second illumination sources 4i, 4ii are decoded successfully. In practice (as will be discussed in more detail later) this condition can be relaxed such as we only need one of the VLC codes is decoded. In cases of certain special geometric distribution of the illumination sources 4, the technique may even work well without decoding any of the codes of the two illumination sources 4i, 4ii. This could be the result of a non-ambiguous map layout, e.g. the user 6 enters a corridor and the camera 16 sees a known light source 4i, and then when the user 6 moves along the same corridor the known topology of the light sources 4 along the corridor provides additional information as to what to expect.

Upon the capturing of the second light source 4ii, the particles are compared, and the particle is selected which best matches the geometric situation of the light source 4ii in the field of view of the camera 16. At that this point, it can be decided from among the particles which is the best matching particle based on the second illumination source 4ii and the geometric relationship between the mobile device 8 and the second illumination source 4ii.

Figure 8:
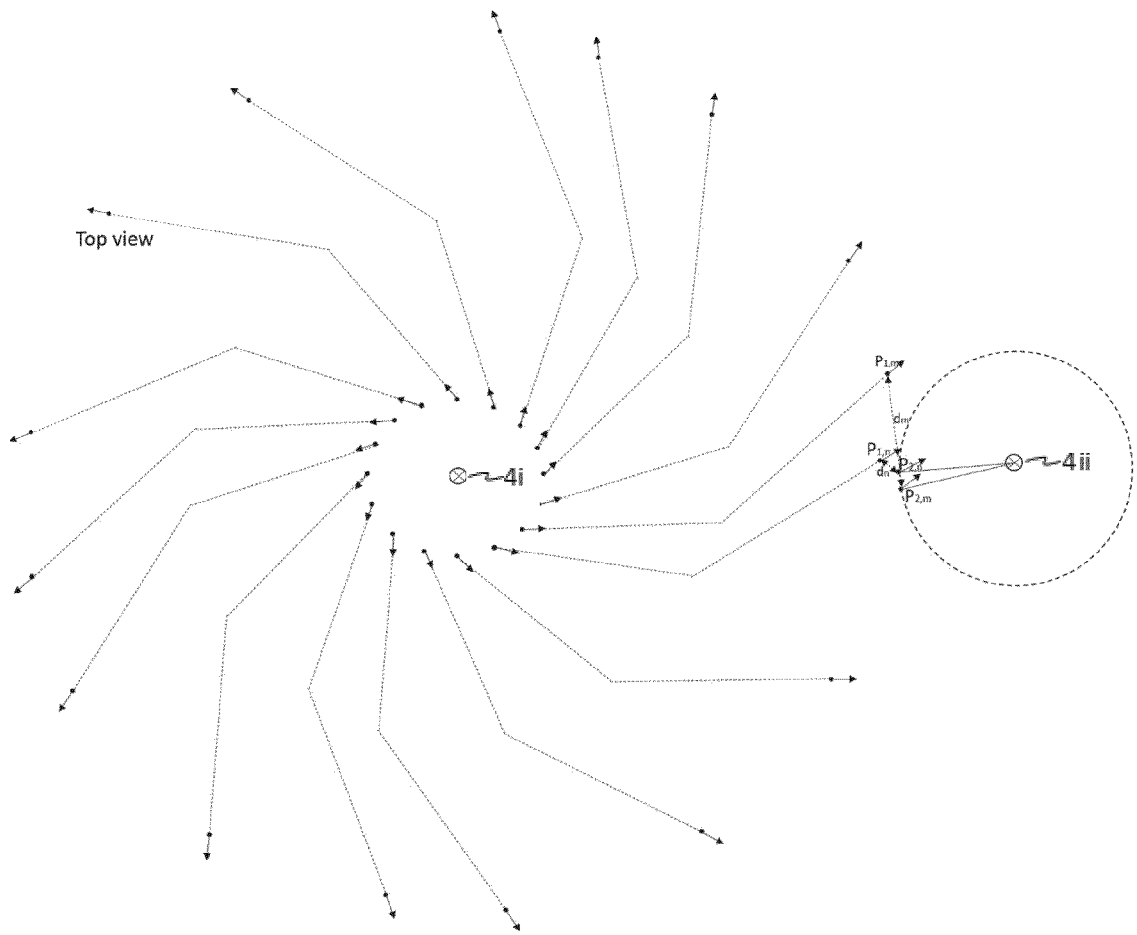
FIG. 8 is a schematic illustration of the comparison of the particles from FIGS. 6 and 7, and a selection of one of the particles based thereon.
Figure 8:
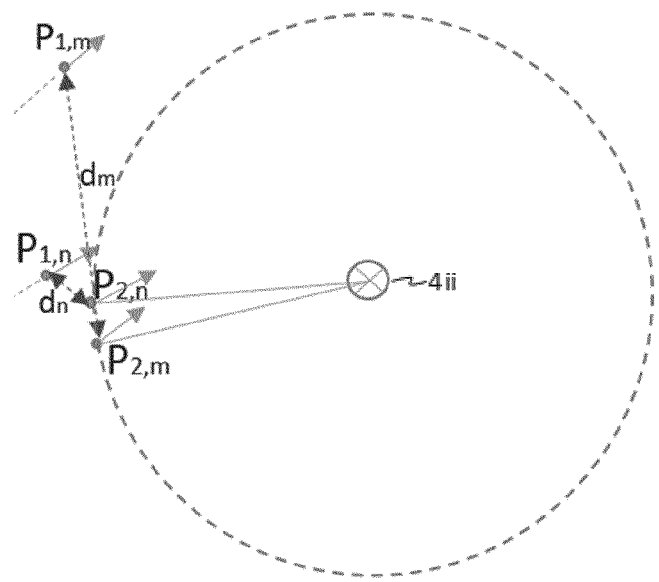

An example of the matching criterion is as follows. When the second illumination source 4ii appears in the camera view, each particle has a certain position based on the history of the propagation, denoted by P1,n for the nth particle. At the same time, based on the device heading angle of each particle and the light source location in the camera view, the position of each particle can also be derived geometrically, and the result is denoted by P2,n for the nth particle. As expected, P2,n should lie on a circle around the second light source 4ii. The distance between the estimated position P1,n and the estimated position P2,n can then be calculated. This distance is denoted by dn. For each particle, such a distance can be calculated. This distance is used as the comparison criterion and the best matching particle is selected as that which has the smallest distance between the two estimated positions. Such a principle is illustrated in FIG. 8, where two particles, the mth and the nth are illustrated. It can be seen that dn is clearly smaller than dm, and hence the nth particle is a better match than the mth particle. Then, the actual position and heading of the mobile device 8 can be determined as those of the nth particle in FIG. 8.

After the second illumination source 4ii comes into in view, one has a determined position and heading of the mobile device 8. From then on, the method may keep deriving the next candidate positions of the mobile device 8. This is also implemented in the form of a particle filter. In practice, once the initial position and device heading fixes have been obtained, the method can continue to keep a number of living particles, and assign each particle a weight factor, which reflects the different distances between P1 and P2 of each particle. Thereafter, the weight also determines the future generation of particles (for use when the mobile device reaches a third illumination source, and so forth).

So to recap, as indicated the present disclosure relates to combining dead-reckoning with coded light based localization. Also because camera images are used rather than, say, a diode detector, heading information can be relative to a light source 4, and this can be used in the system. The dead-reckoning (establishing a steps and the direction thereof relative to the initial starting point) can help improve the initial speed to the first fix as well as improve accuracy. Improvement of accuracy may be desirable when there are limited light sources 4 available and/or when camera images get dropped (as a result of processing issues).

The disclosed technique works by detecting a light source 4 using a mobile device 8 and from there establishing that the mobile device 8 is on a circle around that light source. E.g. this applies if the height of the light source 4 (e.g. in an office) is known. If the light source 4 is a coded light source it can be looked up on a map.

However, it can't be know where on the circle the mobile device 8 is. To work with this the system uses a so-called particle filter; i.e. it generates a number of "particles", where a particle corresponds with a hypothesis in the form of a position on the circle and a heading.

The particle heading is seeded using the image information from the light source 4.

Next if the user 6 moves this is tracked by the pedestrian dead reckoning which uses an accelerometer and/or a gyro (not a magnetometer).

Next the particles are propagated based on the detected motion and this is repeated until the mobile device 8 hits another light source 4ii within its field of view.

Now when the second light source 4ii is encountered, one can again determine a circle on which the mobile device 8 falls, are as well as a heading based on the image data.

With the additional information from the first position and heading on the circle and the path that the user 6 (and therefore mobile device 8) has traveled, one path can be selected and therefore the heading and position of the device 8 can be known.

The directionality that might otherwise be provided by a magnetometer is replaced by a more reliable heading relative to the illumination sources 4. Further, with the combination of PDR and VLC, it becomes possible (once the position of the user is known, so after the initial fix) to update the position more reliably based on PDR; as it is difficult to extrapolate the direction of travel of the user 6 based on the VLC identifiers of a light source 4 that are not yet seen.

Some further variations and extensions of the above-described techniques are now explained.

NUMBER OF KNOWN ILLUMINATION SOURCES: as mentioned, embodiments above have assumed that the identities of both the first and second light sources 4i, 4ii are known (and indeed the third, etc.). The method has access to a map (e.g. floorplan) which maps the identities of the light sources 4 to their respective locations on the map. Hence it can be seen how, once the process above has been performed to find the best matching trajectory, then this combined with the known identities (and therefore known locations) of the first and second light sources can give the approximate position of the mobile device 8.

However, often (but not universally) it is possible to manage with only the code from one of the light sources 4i, 4ii being detected, and the other light sources only being recognized as a "light blob" (i.e. the appearance of a light source is detected, but not its embedded code).

Figure 12A:
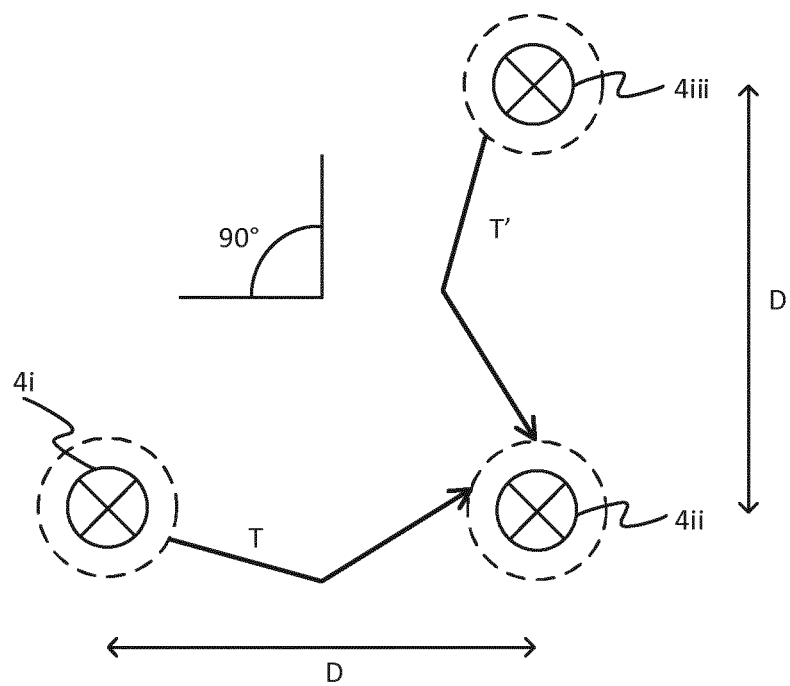
FIG. 12a illustrates a scenario in which a location of both a first and a second illumination sources is required to be known in order to resolve ambiguity between multiple possible solutions.

By way of comparison, FIG. 12a shows a situation where this is not possible. If the light sources 4 are arranged in a regular grid with a regular spacing, and only the location of one light source, say the second light source 4ii, is known; then there are ambiguous solutions. E.g. for a square grid, the true trajectory T cannot be distinguished from a corresponding trajectory T' rotated by ninety degrees. In this situation the location of both illumination sources 4i, 4ii would be required.

Figure 12B:
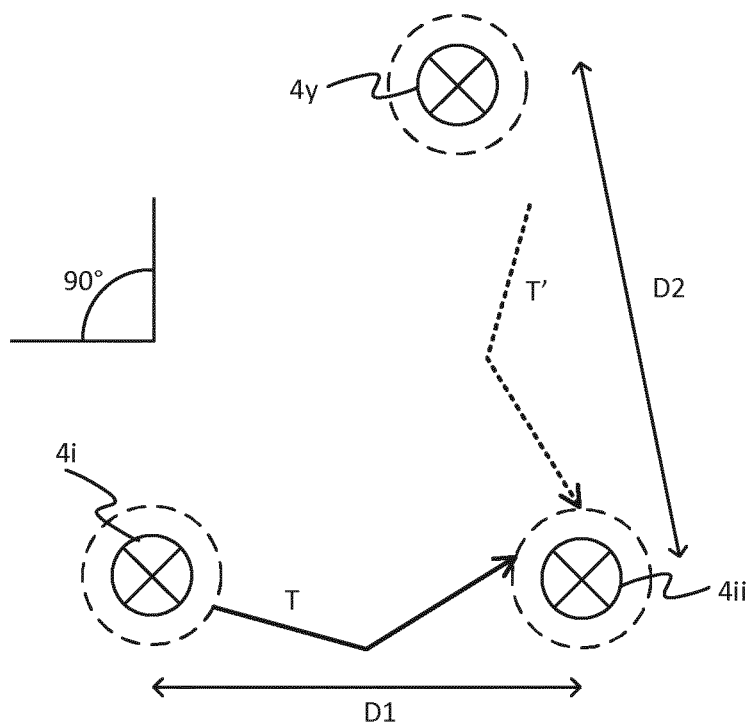
FIG. 12b illustrates a scenario in which a location of only the first or the second illumination source, but not necessarily both, source is required to find an unambiguous solution.

However, if the light sources 4 are not regularly spaced as show in FIG. 12b, then there is only one possible solution even if the location of one light source is known, e.g. 4ii. In this case the method instead exploits predetermined knowledge about the layout light sources 4 on the map (e.g. floorplan), i.e. the knowledge that there is only one with the right distance from the known light source 4ii.

Thus if the locations of all the light sources 4 are known a priori, then given the topology of the light sources 4, and also the movement path of the user 6, it is very often sufficient to see a light source 4 in an image to determine which light it actually is on the map, without decoding the VLC ID explicitly. That is what is meant by "light blob". Basically, a "light blob" is light in an image without decoding the VLC code. Upon starting of the indoor positioning system, it is often required to decode two VLC codes to have a reliable starting position and heading estimation. However, in certain presence of lighting topology and/or movement trajectories, it might be sufficient to have only one VLC code decoded.

After the indoor positioning system is started as explained above, the indoor positioning system works well in practice with only seeing the "light blobs" in the image. That is, when a user 6 moves from a "light blob" to another "light blob" without decoding the codes, the user 6 can still be positioned well, since the ambiguities are resolved by combing the lighting map and the user movement path. E.g. the user 6 enters a corridor and the camera 16 sees a known light source 4i, and then when the user 6 moves along the same corridor the known topology of the light sources 4 along the corridor provides additional information as to what to expect.

IDENTIFYING THE LIGHT SOURCE(S): Furthermore, the known location(s) of the first and/or second light source 4i, 4ii need not be detected based on VLC. At least one location is always needed, but that location does not have to be obtained from VLC. Instead for example, the if the user knows where he or she is on the map, the user could input this to the mobile device 8 and based thereon the method may determine which light source 4 the mobile device 8 must currently be viewing. Or if the user knows the actual ID of one of the light sources he or she is pointing the camera 16 of his or her camera mobile device 8 (e.g. because this one light source 4 is a designated as a particular known reference), then the user 6 could input that directly.

As another example, it may be detected when the user 6 first walks through the entrance (e.g. doorway) of a room, building or other area, e.g. based on an RF tag being detected when the user 6 goes through the door or entrance (with one of an RF tag and reader being included in the mobile device 8 and another of them near the entrance). If it is also known from the map (e.g. floorplan) that a particular one of the light sources 4i is visible when walking through the entrance, this may be sufficient to identify the first light source 4i.

Figure 9:
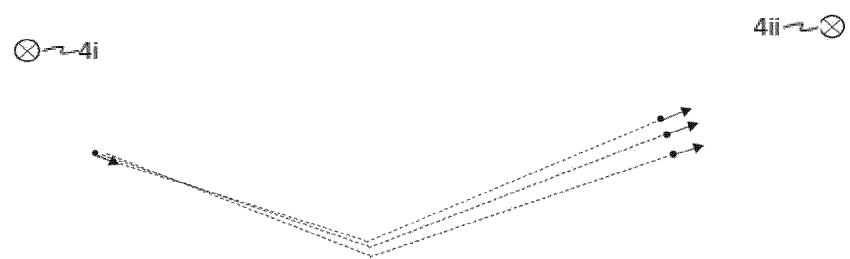
FIG. 9 is a schematic illustration of the propagation of particles following the PDR path when there is no illumination source in the camera view, starting from a known location.

STARTING FROM A KNOWN POSITON: FIG. 9 illustrates how a variant of the disclosed positioning approach works when starting from a known position and heading, rather than staring from multiple candidate locations on a circle around a first light source 4i. In this case, the image of the first light source 4i is only required in order to get the initial heading, not the initial position.

Instead, predetermined knowledge of the initial position can be obtained for example from the process illustrated above by seeing two light sources in the camera view. It can also be obtained by user input, or the continuous process as described above. As another example, the initial known location could be from a fix from another localization system that is then lost, e.g. from a satellite-based location system such as GPS or Galileo, which is lost when the user goes indoors. Or as yet another example, the initial location could be detected based on an RF tag when user 6 goes through a door or other entrance (with one of an RF tag and reader being included in the mobile device 8 and another of them near the entrance).

From a known position and device heading of the mobile device, we can further propagate the particle based on the relative movement information provided by PDR, as illustrated by FIG. 9. In practice, we might also take some randomization into consideration and generate a number of particles from one particle. After we see a second lamp, with or without decoding the VLC code of the lamp, we can already compare and select among the living particles, and hence determine the current position and device heading of the mobile device.

As shown in FIG. 9, from a known position and device heading of the mobile device 9, the particle can be further propagated based on the relative movement information provided by PDR. In practice, some randomization may also be taken into consideration in order to generate a number of particles from one particle. After a second illumination source 4*ii* is seen, with or without decoding the VLC code of that illumination source 4*ii*, it is already possible to compare and select among the living particles, and hence determine the current position and device heading of the mobile device 8.

Figure 10:
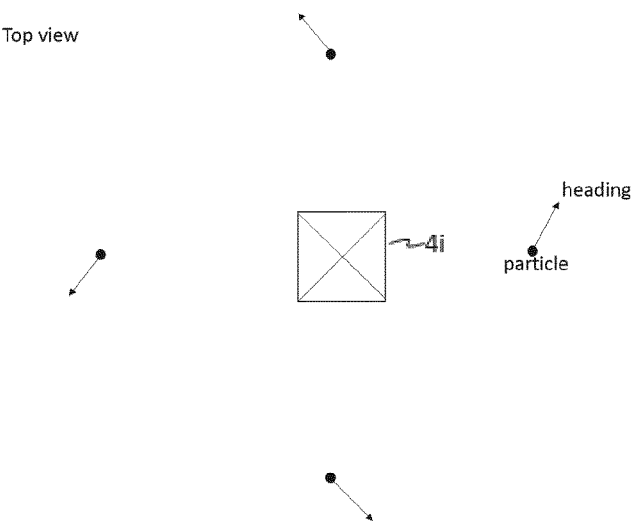
FIG. 10 is a schematic illustration of an initial generation of particles with respect to a square illumination source.

GEOMETRY OF THE ILLUMINATION SOURCE SHAPE: In the above description, we illustrated using the example of circularly symmetrical shape of illumination source 4, and therefore of the "light blob" cast onto the image by the illumination source 4. Based on that, the initial particles were generated in a circular shape. In practice however, there might be illumination sources 4 with different shapes (where this could refer for example to the overall shape of the luminaire housing, or the shape of an element of the luminaire 4 such as a diffuser element, or the shape of an individual lamp). For example, there might be an illumination source 4 with a square shape, where there is only the ambiguity of 90 degrees. Or for an illumination source 4 with a linear shape, there is only an ambiguity of 180 degrees. In these cases, the particles do not need to be generated in a circular shape. Instead, only the degrees of ambiguity due to the illumination source's shape need to be covered. FIG. 10 illustrate the initial generation of the particles with respect to a square illumination source 4. Moreover, when a second illumination source 4*ii* appears in the camera view, and if it is also of a square shape, the generation of P2 based on the second illumination source 4*ii* as illustrated in FIG. 8 will also by adapted based on this shape.

More generally, the seed particles can be generated in a uniform or non-uniform manner. In case the first light source 4*i* is an unknown light source, particles are created on the circle in a uniform manner. However if more information is already available, for instance an indication of a heading, then fewer particles need be created as it is possible to "prune" the number of particles. E.g. such information could be input by a user, or assumed based on predetermined knowledge of the layout of the illumination sources in the room or building, etc.

Figure 11:
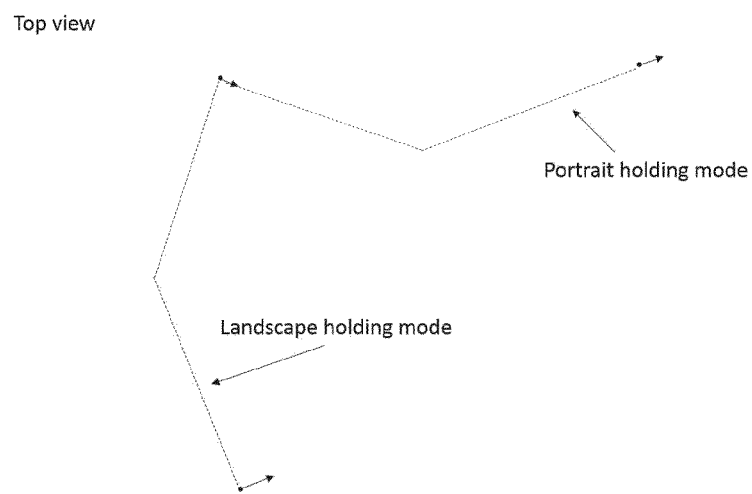
FIG. 11 is a schematic illustration of relative movement direction of a particle with respect to the mobile device's heading.

MOVEMENT DIRECTION WITH RESPECT TO DEVICE HEADING: In the above description, the example has been illustrated where the movement direction is along the device heading (the direction in which the mobile device's camera 16 is pointing). This is indeed normally the case. However, it can also happen that the movement direction is not perfectly aligned with the device heading. As another example, if the user holds the mobile device 8 in the landscape mode instead of the portrait mode, there is a 90 degree difference between the device heading and the user's movement direction. Such situations can be handled in practice by the PDR. The reason is because the PDR employs the data from the sensors 22 within the mobile device. The placement of the sensors with respect to the device heading is known from the device 8. Hence, the PDR is able to give the relative movement of the user 6, relative to the device heading. FIG. 11 illustrates the differences of the propagation of a particle between the portrait and landscape holding modes of the mobile device 8, following the same movement trajectories of the user 6. Note that FIG. 11 is only an example of illustration, and the angle between the device heading and the user movement direction can be any arbitrary angle in practice.

ADAPTING THE PDR MODEL: Once the estimated position is obtained based on the PDR propagation and the images of both the first and second light sources 4*i*, 4*ii*, this gives a quite accurate estimate of the position and heading of the mobile device 8 more accurate in fact than would be obtained using PDR alone. In embodiments this can be exploited to adapt one or more parameters of the PDR model, e.g. step size.

The process begins with a default or at least not well personalised model of the manner in which the user 6 perambulates—i.e. the PDR model. This includes parameters such as step size (the possible parameters of such a model will in themselves be familiar to a person skilled in the art). The PDR model with the default or initial values of the parameters is used to get the estimate of the mobile device's position and heading when it arrives at the second light source 4*ii*, wherein this estimate is based on the fusion of PDR with the described use of the images of the light sources 4*i*, 4*ii*. Then, the end of the PDR trajectory T (i.e. the position estimate that would have been obtained based on PDR alone) can be compared with the (more accurate) estimated position and/or heading as estimated using the fusion approach. This gives a differential, which can be fed back into the PDR model in order to fine tune the value of one or more of the parameters for the PDR model. For example if the parameter in question is step size, then the method can determine the total distance of the trajectory to the more accurate estimated position and divide this by the number of detected steps. Note that a more sophisticated step size model may be employed, e.g. instead of a fixed step size, a step size is estimated as a function of the step frequency. The parameters of such function can initially be chosen as non-personalized, and then refined at the end of the PDR trajectory.

Then when the same approach is repeated to get the position and heading of the mobile device based on the second and a subsequent third light source (not shown), then the adapted model with the tuned parameter(s) can be used to estimate the new position and heading, thus giving an even better estimate.

It will be appreciated that the above embodiments have been described only by way of example.

For instance while embodiments may have been described as such, the scope of the present disclosure is not limited to indoor positioning and can more generally apply to any positioning system based on illumination sources.

Further, as mentioned, the described computations are not limited to being performed at the mobile device 8 itself. In embodiments, the computations involved in the localization can instead be partially or wholly offloaded to a server 24 (which may comprise one or more server units at one or more geographical sites).

Further, the principles disclosed herein need not necessarily be embodied using a particle filter. E.g. other Bayesian filtering techniques can also be used. In general, any method of comparing the extrapolated candidates to the candidates obtained from the newly appearing light source may be used. For instance the estimation may be treated as an optimization problem whereby: (i) starting from the first light source 4i, an initial value of a heading of the mobile device (8) is chosen; (ii) a corresponding initial value of a position of the mobile device (8) is chosen; (iii) the inertial sensor(s) 22 (e.g. PDR) is used to obtain a path (trajectory) extending from the first position and heading; (iv) a second heading and position is determined when the mobile device reaches the second light source 4ii; then (v) the difference between the end of the trajectory and the second positing and heading gives a differential; and (vi) an optimization algorithm is applied to search for a value of the candidate heading or position which minimizes the differential. As yet another possibility, one could enumerate all possible trajectories and search this space for the best match (a "brute force" approach).

Note also that the term "extrapolate" as used herein does not necessarily imply extrapolating into the future per se. In fact, as be apparent from the above embodiments, in embodiments what happens is that as the mobile device travels, the method estimates possibilities as to what might have already happened in the past. Further, the term extrapolate does not necessarily imply any specific mathematical meaning, and any manner of using the inertial sensor(s) to generate propagated candidate locations and headings can fall within the scope of the present disclosure.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. A method comprising:
A) at a first location, using a camera of a mobile device to capture a first image in which a first illumination source appears;
B) by reference to the first illumination source as appearing in the first image, determining first heading information of the mobile device;
C) as the mobile device moves from the first location to a second location, using one or more inertial sensors of the mobile device to extrapolate from the first heading information and from first position information of the mobile device to generate a plurality of extrapolated first candidate locations of the mobile device and a plurality of respective extrapolated first candidate headings of the mobile device;
D) at the second location, using the camera of the mobile device to capture a second image in which a second illumination source appears, wherein the second illumination source does not appear within field of view of the camera until the mobile device has reached the second location from the first location;
E) by reference to the second illumination source as appearing in the second captured image, determining a plurality of second candidate locations of the mobile device, and a plurality of respective second candidate headings of the mobile device; and
F) based on a comparison of the extrapolated first candidate locations and headings with the second candidate locations and headings, determining at least one estimated location and respective heading of the mobile device.

2. The method of claim 1, wherein:
step B) comprises: by reference to the first illumination source as appearing in the first image, determining a plurality of first candidate locations of the mobile device, and a plurality of respective first candidate headings of the mobile device;
step C) comprises: as the mobile device moves to the second location following the capturing of the first image, using one or more inertial sensors of the mobile device to extrapolate from the first candidate locations and headings, thereby generating the plurality of extrapolated first candidate locations and respective extrapolated first candidate headings of the mobile device.

3. The method of claim 2, wherein the method further comprises:
G) as the mobile device moves from the second location to a third location following the capturing of the second image, using one or more inertial sensors of the mobile device to extrapolate from the second candidate locations and headings, thereby generating a plurality of extrapolated second candidate locations and respective extrapolated second headings of the mobile device;
H) at the third location, using a camera of the mobile device to capture a third image in which a third illumination source appears;
I) by reference to the third illumination source as appearing in the third image, determining a plurality of third candidate locations of the mobile device, and a plurality of respective third candidate headings of the mobile device; and
J) based on a comparison of the extrapolated second candidate locations and headings with the third candidate locations and headings, determining an updated estimated location and respective heading of the mobile device.

4. The method of claim 3, wherein step F) comprises allocating relative weights to the second candidate positions and headings and wherein step J) takes into account the relative weights.

5. The method of claim 1, wherein step B) comprises: identifying the first location of the mobile device, and by reference to the first image identifying a respective heading corresponding to the first location; and wherein step C) comprises extrapolating from the first location and the respective heading to generate the plurality of extrapolated first locations and respective extrapolated first headings; wherein the first location is obtained from one of:
a user input, a fix from another localization system that is then lost, an RF tag when a user of the mobile device goes through an entrance, or two illumination sources initially appearing simultaneously in the field of view of the camera.

6. The method of claim 1, wherein said extrapolation comprises including a randomization in the generation of one, some or all of the extrapolated first candidate locations and/or headings; and/or including a random factor in the generation of one, some or all of the extrapolated second candidate locations and/or headings.

7. The method of claim 1, wherein the generation of the first, second and/or third candidate locations and headings comprises limiting the number of first, second and/or third candidate positions and respective headings based on additional information.

8. The method of claim 7, wherein said additional information comprises knowledge that the first, second and/or third illumination source has a non-circular and non- spherical shape, the limitation being performed based on said shape.

9. The method of claim 1, wherein the determination of the first, second and/or third candidate locations and respective headings comprises using one or more sensors of the mobile device to detect an orientation of the camera, and taking the orientation into account in the determination.

10. The method of claim 1, wherein the first and second illumination sources are ones of a greater number of illumination sources whose locations are given by a predetermined map, and wherein:

the first illumination source is identified prior to step F) but the second illumination source is not identified prior to step F), and step F) is performed based on said predetermined map, giving at least the location of the first light source from its identity and the relative displacements of the light sources relative to one another; or the second illumination source is identified prior to step F) but the first illumination source is not identified prior to step F), and step F) is performed based on said predetermined map, giving at least the location of the second light source from its identity and the relative displacements of the light sources relative to one another.

11. The method of claim 10, wherein the first or second illumination source is identified based on:

a respective code embedded in the illumination emitted by the first or second illumination source respectively, or a user input.

12. The method of claim 3, wherein the extrapolation of steps C) and G) is performed based on a pedestrian dead reckoning model, wherein the method further comprises adapting one or more parameters of the pedestrian dead reckoning model based on the estimated position and/or heading as estimated in step C), and wherein the adapted model is used to perform the extrapolation in step G).

13. A non-transitory computer-readable storage medium storing instructions when executed by on one or more processors cause the one or more processors to perform a method on accordance with claim 1.

14. Apparatus comprising a localization module, wherein the localization module is configured to perform operations in accordance with claim 1; wherein the apparatus comprises the mobile device, or a server arranged to communicate with the mobile device, or a system comprising the mobile device and server.

* * * * *